United States Patent
Villar et al.

(10) Patent No.: US 10,089,253 B2
(45) Date of Patent: Oct. 2, 2018

(54) DATA STORE FOR A MODULAR ASSEMBLY SYSTEM

(71) Applicant: Microsoft Technology Licensing, LLC, Redmond, WA (US)

(72) Inventors: Nicolas Villar, Cambridge (GB); Haiyan Zhang, London (GB); James William Scott, Cambridge (GB); Greg Saul, London (GB); Alexandra Keeley Bunting, London (GB); Lee Jason Schuneman, London (GB); Philip Robert Harrison, Chalfont St. Giles (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/453,375

(22) Filed: Mar. 8, 2017

(65) Prior Publication Data

US 2017/0177512 A1    Jun. 22, 2017

Related U.S. Application Data

(63) Continuation of application No. 14/205,077, filed on Mar. 11, 2014, now Pat. No. 9,592,443.

(51) Int. Cl.
*A63F 9/24* (2006.01)
*G06F 13/10* (2006.01)
(Continued)

(52) U.S. Cl.
CPC .......... *G06F 13/102* (2013.01); *A63F 13/235* (2014.09); *A63F 13/58* (2014.09); *A63F 13/73* (2014.09)

(58) Field of Classification Search
CPC .......... A63F 13/08; A63F 13/95; G06F 13/102
See application file for complete search history.

(56) References Cited

U.S. PATENT DOCUMENTS 4,883,440 A    11/1989  Bolli
6,149,490 A    11/2000  Hampton et al.
(Continued)

FOREIGN PATENT DOCUMENTS

CN         202006010 U    10/2011
EP         1271415 A1     1/2003
(Continued)

OTHER PUBLICATIONS

Raffle, H. et al., "Topobo: A Constructive Assembly System with Kinetic Memory," In Proceedings of the SIGCHI Conference on Human Factors in Computing Systems, Apr. 24, 2004, Vienna, Austria, 8 pages.
(Continued)

*Primary Examiner* — Steve Rowland
(74) *Attorney, Agent, or Firm* — Alleman Hall Creasman & Tuttle LLP

(57) ABSTRACT

A data store for a modular assembly system is described. The data store comprises a number of records, each record relating to a physical module in the modular assembly system and comprising a module ID, an owner ID for the module and one or more properties fields. The properties field(s) define any property of the module and different records may define different properties. At least one of the fields in each data record (e.g. the module ID or owner ID) is verified by an authentication service. A user assembles two or more modules into a coherent physical whole object to act as a user input device to an interactive software experience. The data store communicates with the interactive software experience and causes a change in behavior of
(Continued)

the interactive software experience in response to a check of the data records for each of the modules in the object.

19 Claims, 6 Drawing Sheets

(51) Int. Cl.
*A63F 13/235* (2014.01)
*A63F 13/73* (2014.01)
*A63F 13/58* (2014.01)

(56) References Cited

U.S. PATENT DOCUMENTS

| | | |
|---|---|---|
| 6,290,565 B1 | 9/2001 | Galyean, III et al. |
| 6,454,624 B1 | 9/2002 | Duff et al. |
| 6,471,565 B2 | 10/2002 | Simeray |
| 6,526,375 B1 | 2/2003 | Frankel et al. |
| 6,575,802 B2 | 6/2003 | Yim et al. |
| 6,682,392 B2 | 1/2004 | Chan |
| 6,773,322 B2 | 8/2004 | Gabai et al. |
| 6,773,344 B1 | 8/2004 | Gabai et al. |
| 6,954,659 B2 | 10/2005 | Tushinsky et al. |
| 7,003,588 B1 | 2/2006 | Takeda et al. |
| 7,154,363 B2 | 12/2006 | Hunts |
| 7,316,567 B2 | 1/2008 | Hsieh et al. |
| 7,371,177 B2 | 5/2008 | Ellis et al. |
| 7,641,476 B2 | 1/2010 | Didur et al. |
| 7,695,338 B2 | 4/2010 | Dooley et al. |
| 8,079,846 B1 | 12/2011 | Cookson |
| 8,087,939 B2 | 1/2012 | Rohrback et al. |
| 8,257,157 B2 | 9/2012 | Polchin |
| 8,317,566 B2 | 11/2012 | Ganz |
| 8,475,275 B2 | 7/2013 | Weston et al. |
| 8,548,819 B2 | 10/2013 | Chan et al. |
| 8,753,163 B2 | 6/2014 | Gaute |
| 8,753,164 B2 | 6/2014 | Hansen et al. |
| 8,932,123 B2 | 1/2015 | Murayama et al. |
| 9,555,326 B2 | 1/2017 | Scott et al. |
| 9,597,607 B2 | 3/2017 | Bdeir |
| 9,703,896 B2 | 7/2017 | Zhang et al. |
| 2001/0049249 A1 | 12/2001 | Tachau et al. |
| 2002/0196250 A1 | 12/2002 | Anderson et al. |
| 2004/0110557 A1 | 6/2004 | Rowe |
| 2004/0215958 A1 | 10/2004 | Ellis et al. |
| 2005/0059483 A1 | 3/2005 | Borge |
| 2005/0132290 A1 | 6/2005 | Buchner et al. |
| 2007/0072680 A1 | 3/2007 | Ikeda |
| 2007/0097832 A1 | 5/2007 | Koivisto et al. |
| 2007/0184722 A1 | 8/2007 | Doherty |
| 2007/0191100 A1 | 8/2007 | Counts |
| 2007/0198117 A1 | 8/2007 | Wajihuddin |
| 2007/0211047 A1 | 9/2007 | Doan et al. |
| 2008/0009348 A1 | 1/2008 | Zalewski et al. |
| 2008/0294763 A1 | 11/2008 | Uchida |
| 2009/0029771 A1 | 1/2009 | Donahue |
| 2009/0081923 A1 | 3/2009 | Dooley et al. |
| 2009/0197658 A1 | 8/2009 | Polchin |
| 2009/0291764 A1 | 11/2009 | Kirkman et al. |
| 2009/0307592 A1 | 12/2009 | Kalanithi et al. |
| 2010/0007528 A1 | 1/2010 | Urata et al. |
| 2010/0026458 A1 | 2/2010 | Samdahl et al. |
| 2010/0167623 A1 | 7/2010 | Eyzaguirre et al. |
| 2011/0021109 A1 | 1/2011 | Le et al. |
| 2012/0050198 A1 | 3/2012 | Cannon |
| 2012/0122059 A1 | 5/2012 | Schweikardt et al. |
| 2012/0286629 A1 | 11/2012 | Johnson et al. |
| 2013/0109267 A1 | 5/2013 | Schweikardt et al. |
| 2013/0109272 A1 | 5/2013 | Rindlisbacher |
| 2013/0122753 A1 | 5/2013 | Blakborn |
| 2013/0165223 A1 | 6/2013 | Leyland et al. |
| 2013/0196770 A1 | 8/2013 | Barney et al. |
| 2013/0288563 A1 | 10/2013 | Zheng et al. |
| 2014/0030955 A1 | 1/2014 | Smetanin et al. |
| 2014/0244018 A1 | 8/2014 | Bach et al. |
| 2015/0004871 A1 | 1/2015 | Laursen |
| 2015/0104774 A1 | 4/2015 | Watry et al. |
| 2015/0258434 A1 | 9/2015 | Scott et al. |
| 2015/0258435 A1 | 9/2015 | Zhang et al. |
| 2015/0258440 A1 | 9/2015 | Zhang et al. |
| 2017/0308624 A1 | 10/2017 | Zhang et al. |

FOREIGN PATENT DOCUMENTS

| | | |
|---|---|---|
| EP | 1287869 A2 | 3/2003 |
| EP | 1291138 A2 | 3/2003 |
| EP | 1883194 A1 | 1/2008 |
| EP | 2311539 A2 | 4/2011 |
| WO | 0112285 A1 | 2/2001 |
| WO | 0169799 A2 | 9/2001 |
| WO | 0169829 A2 | 9/2001 |
| WO | 2005083546 A1 | 9/2005 |
| WO | 2009037679 A1 | 3/2009 |
| WO | 2010063938 A1 | 6/2010 |
| WO | 2012160055 A1 | 11/2012 |

OTHER PUBLICATIONS

Kikin-Gil, R., "BuddyBeads," Ruth Kikin Website, Available Online at http://www.ruthkin.com/Images/r.kikin-gil_thesis2005.pdf, Oct. 10, 2006, 50 pages.
Lampe M. et al., "The Augmented Knight's Castle-Integrating Mobile and Pervasive Computing Technologies into Traditional Toy Environments," In Proceedings of the Pervasive Learning Workshop at the Pervasive Conference, May 13, 2007, Toronto, Canada, 19 pages.
Lampe M. et al., "Integrating Interactive Learning Experiences into Augmented Toy Environments," In Proceedings of the Pervasive Learning Workshop at the Pervasive Conference, May 13, 2007, Toronto, Canada, 8 pages.
Ahde, P. et al., "Hello—Bracelets Communicating Nearby Presence of Friends," In Proceedings of the Tenth Anniversary Conference on Participatory Design, Sep. 30, 2008, Bloomington, Indiana, 3 pages.
Schweikardt, E., "Designing Modular Robots," Dissertation, Carnegie Mellon University, 2009, 90 pages.
Labrune, J. et al., "Telebeads: Social Network Mnemonics for Teenagers," In Proceedings of the Conference on Interaction Design and Children, Jun. 7, 2009, Tampere, Finland, 8 pages.
Patrizia M. et al., "A Robotic Toy for Children with special needs: From requirements to Design," In Proceedings of the IEEE 11th International Conference on Rehabilitation Robitics, Jun. 23, 2009, Kyoto, Japan, 6 pages.
Robertson, J., "Encouraging Girls to Study Geeky Subjects (Part 2): Programmable Bracelets," Communications of the ACM website, Available Online at https://cacm.acm.org/blogs/blog-cacm/85132-encouraging-girls-to-study-geeky-subjects-part-2-programmable-bracelets/fulltext, Apr. 12, 2010, 2 pages.
Kuniavsky, M., "Smart Things: Ubiquitous Computing User Experience Design," Available Online at https://goo.gl/nwbek8, Sep. 9, 2010, 1 page.
Schmid S. et al., "Networking Smart Toys with Wireless ToyBridge and ToyTalk," In Proceedings of the IEEE International Conference on Computer Communications, Apr. 10, 2011, Shanghai, China, 2 pages.
Zaino, J., "NFC Technology Brings New Life to Games," Journal of RFID, Oct. 1, 2012, 10 pages.
Fortmann, J. et al., "Illumee: Aesthetic Light Bracelet as a Wearable Information Display for Everyday Life," In Proceedings of the ACM Conference on Pervasive and Ubiquitous Computing Adjunct Publication, Sep. 8, 2013, Zurich, Switzerland, 4 pages.
"Skylanders Swapforce," Skylanders Website, Retrieved Online at http://www.skylanders.com/swapforce, Available as Early as Feb. 9, 2013, Retrieved on Sep. 11, 2013, 3 pages.
"Cubelets," Modular Robotics Website, Retrieved Online at http://www.modrobotics.com/, Available as Early as Aug. 7, 2009, Retrieved on Sep. 11, 2013, 1 page.

(56) References Cited

OTHER PUBLICATIONS

"Disney Infinity," Disney Website, Retrieved Online at at https://infinity.disney.com/en-gb, Available as Early as Apr. 3, 2013, Retrieved on Nov. 19, 2013, 9 pages.
"Shapeways," Shapeways Website, Retrieved Online at http://shapeways.com/, Available as Early as Apr. 3, 2008, Retrieved on Nov. 19, 2013, 3 pages.
"Seebo Platform," Seebo Website, Retrieved Online at http://www.seebo.com, Jun. 22, 2013, 4 pages.
"The NEX Band," Mighty Cast Website, Retrieved Online at http://www.mightycast.com, Jan. 3, 2014, 4 pages.
United States Patent and Trademark Office, Non-Final Office Action Issued in U.S. Appl. No. 14/205,077, Oct. 29, 2015, 10 pages.
IPEA European Patent Office, International Preliminary Report on Patentability Issued in PCT Application No. PCT/US2015/019341, dated Apr. 26, 2016, WIPO, 7 pages.
ISA European Patent Office, International Search Report and Written Opinion Issued in PCT Application No. PCT/US2015/019341, dated Jun. 15, 2015, WIPO, 11 pages.
United States Patent and Trademark Office, Notice of Allowance Issued in U.S. Appl. No. 14/205,077, dated Jun. 28, 2016, 7 pages.
United States Patent and Trademark Office, Notice of Allowance Issued in U.S. Appl. No. 14/205,077, dated Oct. 31, 2016, 7 pages.
IPEA European Patent Office, Second Written Opinion Issued in PCT Application No. PCT/US2015/019341, dated Jan. 26, 2016, 6 pages.
"Office Action Issued in European Patent Application No. 15716200.9", dated Jan. 3, 2018, 4 pages.
"Final Office Action Issued in U.S. Appl. No. 14/203,991", dated Mar. 4, 2016, 5 Pages.
"Non Final Office Action Issued in U.S. Appl. No. 14/203,991", dated Aug. 16, 2016, 6 Pages.
"Non Final Office Action Issued in U.S. Appl. No. 14/203,991", dated Sep. 29, 2015, 11 Pages.
"Notice of Allowance Issued in U.S. Appl. No. 14/203,991", dated Mar. 6, 2017, 7 Pages.
"Non-Final Office Action Issued in U.S. Appl. No. 14/204,239", dated Mar. 21, 2016, 10 Pages.
"Notice of Allowance Issued in U.S. Appl. No. 14/204,239", dated Sep. 12, 2016, 8 Pages.
"Final Office Action Issued in U.S. Appl. No. 14/204,483", dated Nov. 30, 2017, 19 Pages.
"Final Office Action Issued in U.S. Appl. No. 14/204,483", dated Sep. 13, 2016, 17 Pages.
"Non Final Office Action Issued in U.S. Appl. No. 14/204,483", dated Apr. 15, 2016, 22 Pages.
"Second Written Opinion Issued in PCT Application No. PCT/US2015/018562", dated Mar. 22, 2016, 5 Pages.
"Non Final Office Action Issued in U.S. Appl. No. 14/204,483", dated Jun. 2, 2017, 18 Pages.
"Final Office Action Issued in U.S. Appl. No. 14/204,740", dated May 11, 2017, 14 Pages.
"Non Final Office Action Issued in U.S. Appl. No. 14/204,740", dated Oct. 6, 2016, 12 Pages.
"Non Final Office Action Issued in U.S. Appl. No. 14/204,740", dated Mar. 22, 2018, 17 Pages.
"Notice of Allowance Issued in U.S. Appl. No. 14/204,483", dated Apr. 2, 2018, 7 Pages.
"Supplementary Search Report Issued in European Patent Application No. 15762353.9", dated Oct. 6, 2017, 7 Pages.
"Office Action Issued in Chinese Patent Application No. 201580013171.0", dated Apr. 4, 2018, 7 Pages.
Gilpin, et al., "Robot Pebbles: One Centimeter Modules for Programmable Matter Through Self-Disassembly", In IEEE International Conference on Robotics and Automation, May 3, 2010, 8 Pages.
Sorbet, et al., "Triangles: Tangible Interface for Manipulation and Exploration of Digital Information Topography", In roceedings of the SIGCHI Conference on Human Factors in Computing Systems, Jan. 1, 1998, pp. 49-56.
"International Search Report and Written Opinion Issued in PCT Application No. PCT/US2015/018560", dated May 20, 2015, 8 Pages.
"International Preliminary Report on Patentability Issued in PCT Application No. PCT/US2015/018561", dated Mar. 10, 2016, 8 Pages.
"International Search Report and Written Opinion Issued in PCT Application No. PCT/US2015/018561", dated May 20, 2015, 10 Pages.
"Second Written Opinion Issued in PCT Application No. PCT/US2015/018561", dated Dec. 14, 2015, 6 Pages.
"International Preliminary Report on Patentability Issued in PCT Application No. PCT/US2015/018562", dated Jun. 13, 2016, 6 Pages.
"International Search Report & Written Opinion Issued in PCT Application No. PCT/US2015/018562", dated Sep. 2, 2015, 12 Pages.
"Office Action Issued in Chinese Patent Application No. 201580013171.0", dated Apr. 4, 2018, 9 pages.
"Office Action Issued in European Patent Application No. 15/118,279", dated Jun. 13, 2018, 5 pages.
"Non-Final Office Action Issued in U.S. Appl. No. 15/646,004", dated Jun. 22, 2018, 12 pages.

DATA STORE FOR A MODULAR ASSEMBLY SYSTEM

CROSS REFERENCE TO RELATED APPLICATIONS

This application is a continuation of U.S. patent application Ser. No. 14/205,077, filed Mar. 11, 2014, the entire disclosure of which is hereby incorporated herein by reference.

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known gaming systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A data store for a modular assembly system is described. The data store comprises a number of records, each record relating to a physical module in the modular assembly system and comprising a module ID, a properties field and in various examples, an owner ID for the module. The properties field(s) define any property of the module and different records may define different properties. At least one of the fields in each data record (e.g. the module ID or owner ID) is verified by an authentication service. A user assembles two or more modules into a coherent physical whole object to act as a user input device to an interactive software experience. The data store communicates with the interactive software experience and causes a change in behavior of the interactive software experience in response to a check of the data records for each of the modules in the object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A system is described below which comprises a data store that stores information about physical modules which are components of a larger user-assembled object. A user can connect two or more of the modules together to form a coherent physical whole object (which may be referred to as a 'modular toy') and by selecting different combinations and/or arrangements of modules, different objects can be created. The data store (which may be a central store or distributed) comprises a number of data records, each record being associated with a physical module and comprising a module ID (i.e. an identifier for the module), one or more properties of the module and in various examples, an owner ID (i.e. an identifier for the owner of the module). At least one of the module ID and owner ID fields are verified by an authentication service. The data store provides an interface to enable an interactive software experience (such as a game) to check one or more records and this check may trigger a change in the behavior of the interactive software experience, or may cause other actions such as changes to the data in the data store (e.g. recording history of use of the toy). As described in more detail below, the checking may be performed by the interactive software experience or the data store itself (in response to a request by the interactive software experience). Records in the data store may be updated by the interactive software experience, a module (e.g. the module to which the record relates or another module) or another application.

In addition to being affected by the outcome of the check of one or more records in the data store, operation of the interactive software experience is also affected by the particular combination of modules which are put together to form the object and in various examples by any subsequent user interaction with the object, as the object acts as a user input device for the interactive software experience. User interaction with one or more modules or one or more objects (formed from modules) translates into inputs to the interactive software experience and the translation (from user interaction to interactive software experience input) may be performed within a module, within the object and/or within the interactive software experience.

Figure 1:
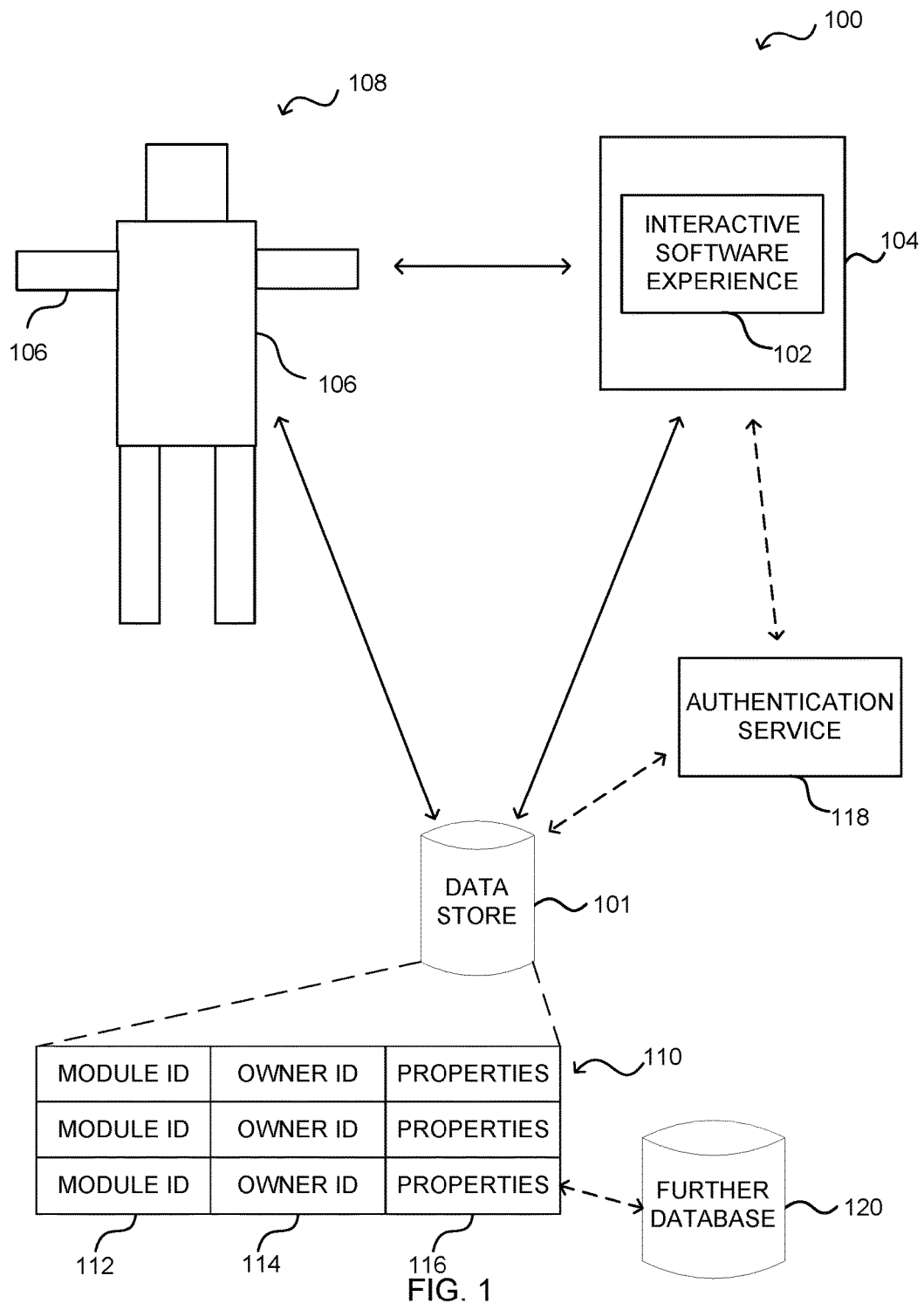
FIG. 1 is a schematic diagram of an example system comprising a data store which interacts with an interactive software experience.

FIG. 1 is a schematic diagram of a system 100 comprising a data store 101 which interacts with an interactive software experience 102 and may also interact with an object 108 formed from a plurality of physical modules 106. The interactive software experience runs on a computing-based device 104 and interacts with the plurality of modules 106 which are connected together to form the coherent physical whole object 108. The interactive software experience 102 may, for example, be a game, social media application, personal organization application (e.g. which enables one or more users to set out a family/work schedule through physical tokens in the form of modules which represent particular tasks), multimedia application (e.g. which allows a user to compose photographs and music represented by physical tokens in the form of modules into a slideshow/movie for sharing), etc. The interactive software experience 102 comprises device-executable instructions, which when executed implement the features of the experience, some of which are described herein, and these device-executable instructions may be stored on the computing-based device 104 or may be stored remotely.

The data store 101 comprises a plurality of data records 110, each record being relating to (i.e. being associated with) a physical module 106 and comprising the ID of the module 112 (or module ID), an identifier for the owner of the module 114 (or owner ID) and one or more properties 116 of the module. At least one of the module ID 112 and owner ID 114 fields are verified by an authentication service 118 (which may form part of the system 100 or be external to the system) and the data store 101 and/or the interactive software experience 102 may communicate with the authentication service 118. An authentication service provides a method of securely verifying properties about a field's value, e.g. that the owner ID is correct, or that the module ID has been issued to the module by a trusted party and thereby that the module is not a counterfeit. The module ID 112 for a module 106 may be unique to that module and the owner ID 114 is unique to the owner of the module (which may be a person or other entity, such as manufacturer of the module, or the owner of the design of the module which may license manufacturing rights to other companies), although a person or other entity may have more than one distinct owner ID. In various examples, the data records 110 may not include an owner ID field.

The properties field(s) 116 within each data record 110 may comprise any property of the module to which the record relates (as identified by the module ID 112). Examples of properties include, but are not limited to: GPS location data for the module (e.g. a "home" location and/or a current location), interoperability data (e.g. which other modules or types of modules the module can interwork with and/or which interactive software experiences the module can be used with), statistics for the module (e.g. length of time in use, etc.), virtual objects associated with the module (e.g. where these objects have been collected within an interactive software experience), permissions associated with the module (e.g. which fields within the data record can be changed and by whom and in various examples the permissions may be dependent upon the use of the object, such as which interactive software experience it is being used with), interactive software experience data (e.g. textures, device-executable instructions for the software experience or a part thereof, etc.), state data (which may be specific to a particular interactive software experience or independent of any interactive software experience) and references to a secondary (or further) database 120 (e.g. which may contain additional information about, for example, the owner of the module, as identified by the owner ID 114). It will be appreciated that where the properties field comprises sensitive user data, consent may be collected from the user to store and release this data.

In various examples the properties field 116 may define sets of modules, these sets of modules may, for example, be predefined sets of modules which work well together and which when used together unlock particular features of the interactive software experience. Similarly, sets may be defined which do not work well together. The sets may be advertised to the user or visible through module form factors (e.g. all modules that are robot body parts may work together, but modules which are animal body parts may not work with robot body parts) or in other examples, a set may be a particular combination that a user may discover through interaction with the modules. Although the sets are described above as being part of the constant data, in other examples, set data may form part of the variable data (described below), with sets forming over time (e.g. based on which modules a user regularly uses together to form an object).

Where the properties field 116 comprises interactive software experience data, this may comprise game data, such as:
  a 2D/3D representation of the module which can be used within a graphical user interface (GUI) of the interactive software experience to represent the module (e.g. a 3D model, image and/or texture map) or other data describing the module's physical characteristics (e.g. its shape, its texture, etc.) which is used by the interactive software experience to render the experience
  audio snippets or text associated with that module, e.g. to be used in the portrayal of that module's character (or be integrated into the portrayal of the coherent whole object's character)
  specifications of movements associated with that module or character, e.g. for an arm module it may have characteristic arm-swing action(s) while the coherent whole character is walking or running, etc.
  a mini-game which is enabled within the interactive software experience as a result of using the module or a particular combination (e.g. set) of modules or may be enabled when the user reaches a particular point in the interactive software experience (e.g. at a particular score or level), this may be considered to be part of the interactive software experience
  story-line elements from the interactive software experience (e.g. cut-scenes, new missions, etc.), again this may be considered to be part of the interactive software experience
  the entire interactive software experience (e.g. executable files comprising the interactive software experience or part thereof).

Where the properties field 116 comprises state data, this may comprise state data which is specific to a particular interactive software experience (e.g. game dependent) or independent of the interactive software experience with which the module is used (e.g. game independent). Examples of state data which is independent of the interactive software experience with which the module is used include:
  a total real world time in use or number of total uses
  percent history of use
  physical state information for the module (e.g. physical failure states such as an indicator that a sensor has failed or a rotating arm cannot rotate, battery levels, etc.)

details of use with other modules (e.g. IDs of other modules that it has been used with, details of sets of modules which have been used together with the module, etc.)

details of the interactive software experiences with which the module has been used details of the devices with which the modules have interacted (e.g. devices executing the interactive software experience) or otherwise sensed, e.g. by sensing their Bluetooth MAC address.

details of where in the world the module has been used, and of other modules that were also present in such locations (and other users that were present)

Examples of state data which is specific to a particular interactive software experience include:

History within the interactive software experience, e.g. a timeline of use, possibly detailed enough to facilitate re-viewing of past events.

Scores or values which are specific to the particular interactive software experience and may, for example, "achievements" unlocked, etc.

Details of use with other modules in the particular interactive software experience (e.g. IDs of other modules that it has been used with, details of sets of modules which have been used together with the module, etc.)

Details of virtual items from/for the interactive software experience (e.g. such that a module's storage acts as a container for these virtual items)

Where the interactive software experience is a game, the history may comprise a history of past fight encounters and/or the scores/values detailed above may, for example, comprise one or more of:

One or more attribute values, e.g. health, speed, durability, etc.

An experience indicator

Details of any powerups or special skills that have been learned/earned/won by the particular module in the game.

Where the properties field 116 comprises a reference to another database, this database may contain additional information about the owner of the module as identified by the owner ID 114 within the data record 110. By using such a reference, an owner may have properties (e.g. state, user characteristics, permissions, etc.) which are reflected in all the modules that they own. Where the reference identifies user characteristics (e.g. a user's age), this may enable different permissions to be associated with modules based on user characteristics of the owner (as identified by the owner ID 114).

Where the properties field 116 comprises a reference to another database, this database may contain additional information about the module, such as generic properties which are applicable to all modules of a particular type. By using such a reference, properties may be reflected in a group of modules such that properties do not need to be replicated within each data record 110 for each module in the group and/or stored within the interactive software experience. In an example, all modules of the type "robot arm" may comprise a link to a database entry which details the generic properties for all robot arms. Modules of the type "robot head" may comprise a link to a different database entry which details the generic properties for all robot heads.

It will be appreciated that the secondary database 120 may be part of the system 100 or external to the system. Furthermore, where the secondary database 120 is part of the system 100 it may be co-located with the data store 101.

Through inclusion of different elements within the properties field(s) 116, various different mechanisms are enabled within the system 100, such as enabling transactions involving modules, theft prevention, anti-counterfeiting measures (e.g. anti-cloning, anti-copying), etc. and these and other examples are described in more detail below. Whilst the interactive software experience changes its behavior in response to a check of a plurality of data records, it will be appreciated that where counterfeit or stolen modules are identified as a result of these checks, the interactive software experience may not change its behavior in a way which is visible to the user (e.g. the problem may be flagged to a third party in a manner which is not visible to the user, for example, for offline action). Alternatively, although there may be a change in the visible behavior, this may be unrelated to the identification of a module being counterfeit or stolen (but may be in response to other aspects of the check performed) and any flagging of the issue with the module may be performed by the data store rather than the interactive software experience.

Although FIG. 1 shows a single data store 101, the data store 101 may be implemented as a central data store or a distributed data store. Where the data store 101 is implemented as a distributed data store, the individual data records 110 may be stored locally on the module to which they relate or there may be multiple data stores within the system each storing some or all of the data records 110 (e.g. there may be duplication of data records between data stores). In various examples, there may be a combination of a central data store and a plurality of distributed data stores, where each data record is stored in both the central data store and one of the plurality of distributed data stores. In such examples, one copy of each data record (e.g. the copy stored in the distributed data store) may be denoted the primary version. In an example, a data record may be stored in the module to which it relates may be the primary version and a copy of this data record may be stored in a central store. In such an example, an interactive software experience may access the data records stored in the central store and the central store may update their records periodically or when changes occur to the primary version of a record such that the central store remains substantially synchronized with the primary versions of each data record.

Furthermore, although FIG. 1 shows a single object 108, a single interactive software experience 102, a single computing-based device 104 and a single further database 120, in other examples there may be more than one object 108 which interacts with the interactive software experience 102, multiple computing-based devices 104, multiple interactive software experiences 102, and/or multiple further databases 120.

Figure 2:
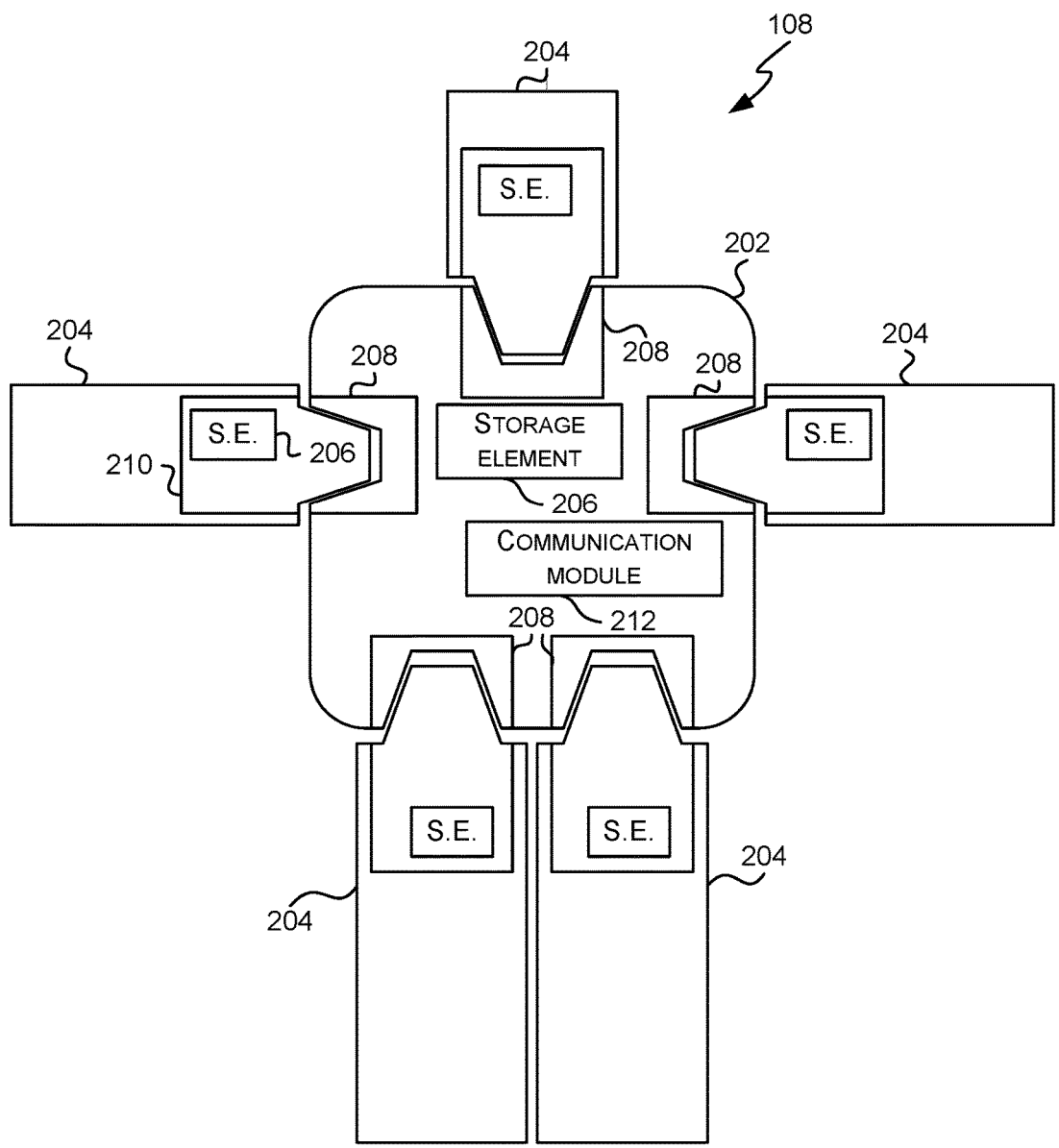
FIG. 2 shows an enlarged view of the coherent physical whole object shown in FIG. 1.

FIG. 2 shows an enlarged view of the coherent physical whole object 108 shown in FIG. 1. It can be seen in FIG. 2 that each module 106, 202, 204 comprises a storage element 206 (e.g. a memory) and one or more connectors 208, 210. The connectors 208, 210 physically attach the modules 106, 202, 204 together and may also pass data and power between modules. The storage element 206 which may be integrated within a connector (e.g. as shown in module 204 in FIG. 2) or separate from a connector (e.g. as shown in module 202 in FIG. 2), is arranged to store the ID of the module (the module ID 112) and may also store other data, such as the owner ID, or other data for the module (referred to as module data). The module IDs are used by the interactive software experience 102 to identify which modules 106 have been used to form the object 108 and are then used to access data records 110 for the modules 106. As described above, both the module IDs and the accessed data may affect the operation (or behavior) of the interactive software experience 102.

Once assembled by a user from the modules 106, 202, 204, the coherent physical whole object 108 is physically attached together to form a single object, i.e. requiring a deliberate action by the user to detach (e.g. an applied force to overcome a mechanical friction fit or a magnetic attachment holding the modules together, or an unclasping or threading action so that a module can be removed or disconnected from an adjacent module). This is in contrast to systems in which a module or modules are sensed to be near or touching one another, but no mechanical element holds them together (with the exception of gravity, if the whole assembly is only lifted vertically from underneath). The coherent physical whole object 108 is moveable freely (e.g. in three dimensions) by a user and is capable of communicating with the interactive software experience while it is in motion. The coherent physical whole object 108 (and/or the modules from which it is formed) may comprise mechanical articulation or movement affordances, e.g. it may have joints such as hinges, or some elements may be mobile compared to other elements, e.g. sliding or rotation with respect to one another.

The modules 106, 202, 204 may, for example, represent parts (e.g. head, body, limbs) of a humanoid/animal/mystical character (e.g. a human, animal or robot), vehicles or parts thereof (e.g. chassis, wheels, roof, etc.), accessories for a vehicle or character (e.g. weapons, clothing, armor, or other objects which the character may wear/carry/hold), tracks (e.g. for a car, train, human, animal or other mobile object), bricks (e.g. as part of a construction set), baseboards or levels (e.g. where the tracks/bricks/baseboards/levels may form part of a playset such as a train set, model village, tower block, dolls house or other construction) or parts of an educational toy (e.g. parts of a molecular model, skeleton or body, etc.).

At least one of the modules 106, 202, 204 in the coherent physical whole object 108 comprises a communications module 212 which enables the module 202 to communicate with the game software 102. Any suitable communication technology may be used, including wireless technologies (e.g. Bluetooth®, Bluetooth® Low Energy (BLE), WiFi™ or WiFi™ Direct, Near Field Communication (NFC), 802.15.4, etc.) and wired technologies. The communications module 212 may communicate directly with the computing device 104 running the interactive software experience 102 (e.g. smartphone, tablet computer, games console, etc.) or may communicate via a network (e.g. a home network or the internet) or intermediary device (e.g. a wireless access point) or intermediary server (e.g. cloud server).

The information which is communicated from the coherent physical whole object 108 to the interactive software experience 102 (via the communication module 212) comprises the IDs of the modules 106, 202, 204 and may also comprise information about their arrangement (which may be referred to as topology information), sensor data (if any of the modules include sensors), some or all of the module data stored in the modules etc. Where only one of the modules comprises a communication module 212 (e.g. as shown in FIG. 2) this module 202 (which may be referred to as a core module) may aggregate the data for the other modules 204 in the object 108 (which may be referred to as peripheral modules) and send the aggregated data to the interactive software experience 102. Where each module comprises a communication module, each module may communicate data about itself to the interactive software experience 102. In other examples, any module that comprises a communication module 212 may send its own data and optionally data for one or more other modules within the object 108.

In various examples, one or more of the modules (e.g. a module 202 which also comprises a communication module 212) may also comprise a processor arranged to collect the IDs of other modules (e.g. all modules or a subset of modules) connected to form the coherent physical whole 108 and to collect other data from each of the modules. The processor may be a microprocessor, controller or any other suitable type of processor for processing computer executable instructions to control the operation of the core module in order to collect data from connected modules. In various examples, the data may be collected by a core module from each of the connected modules directly (e.g. via a bus which is electrically connected via the connectors or other means, such as using NFC, QR codes or computer vision). In other examples, however, each module may collect information on its neighbors such that a core module aggregates the data provided by its direct neighbor modules.

It will be appreciated that the modules 106, 202, 204 may comprise additional elements not shown in FIG. 2, such as batteries, sensors, actuators, displays, additional hardware logic, etc. It will further be appreciated that although FIGS. 1 and 2 show one module 106, 202 as a robot body and the other modules 106, 204 as the head and limbs, each of the modules can have any physical form factor (e.g. any shape of external housing) which is compatible with the other modules (i.e. each module is shaped such that it can connect to at least one other module, without the outer housing clashing).

Figure 3:
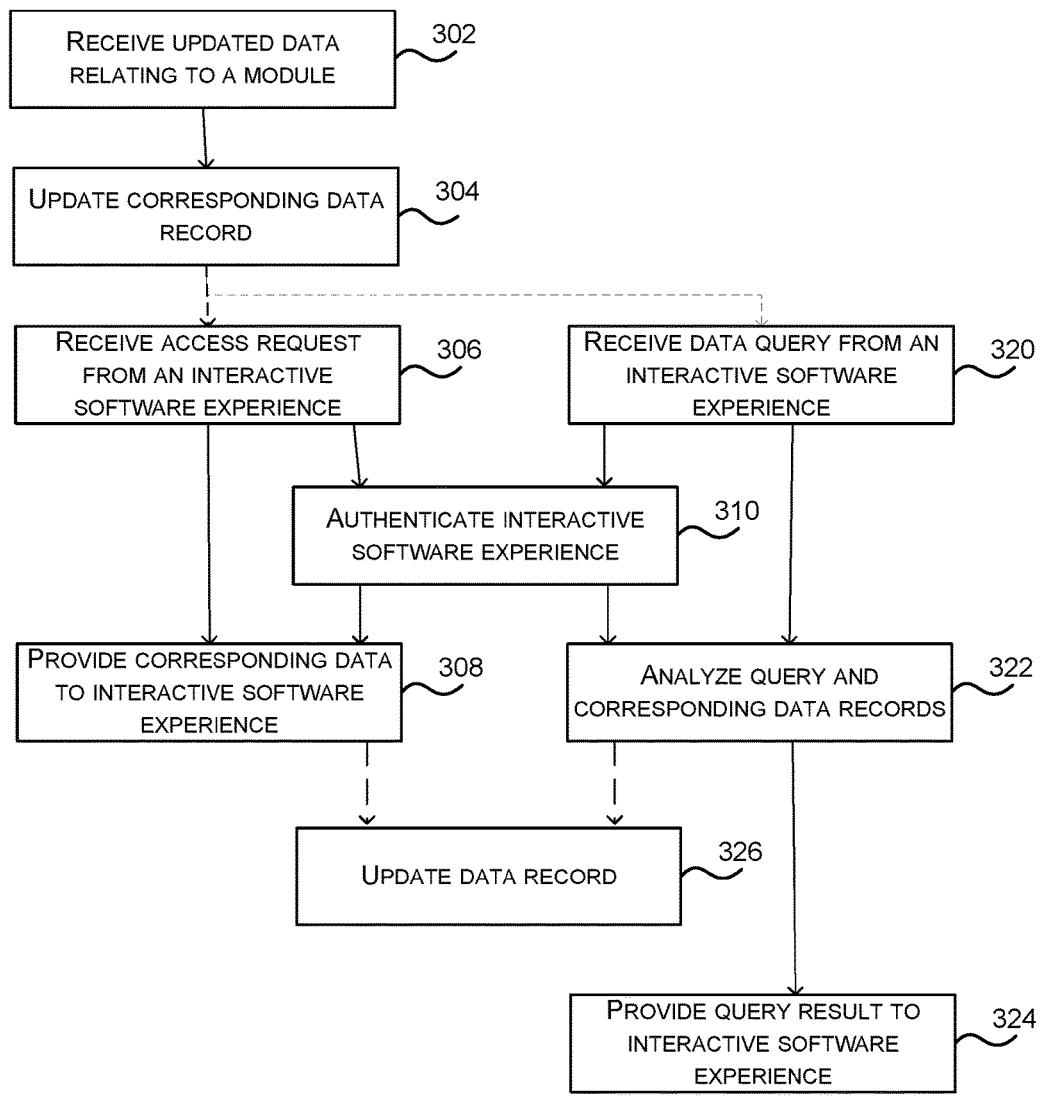
FIG. 3 is a flow diagram showing an example method of operation of a data store.

The operation of the system 100 shown in FIG. 1 may be described with reference to FIGS. 3 and 4. FIG. 3 is a flow diagram showing an example method of operation of the data store 101 and FIG. 4 is a flow diagram showing an example method of operation of the interactive software experience 102.

As described above, the data store 101 stores a plurality of data records 110, each relating to a physical module 106 which can be connected to other modules 106 by a user to form a coherent physical whole object 108. Each record 110 comprises a number of fields, including the module ID 112, properties 116 and optionally an owner ID 114.

Figure 4:
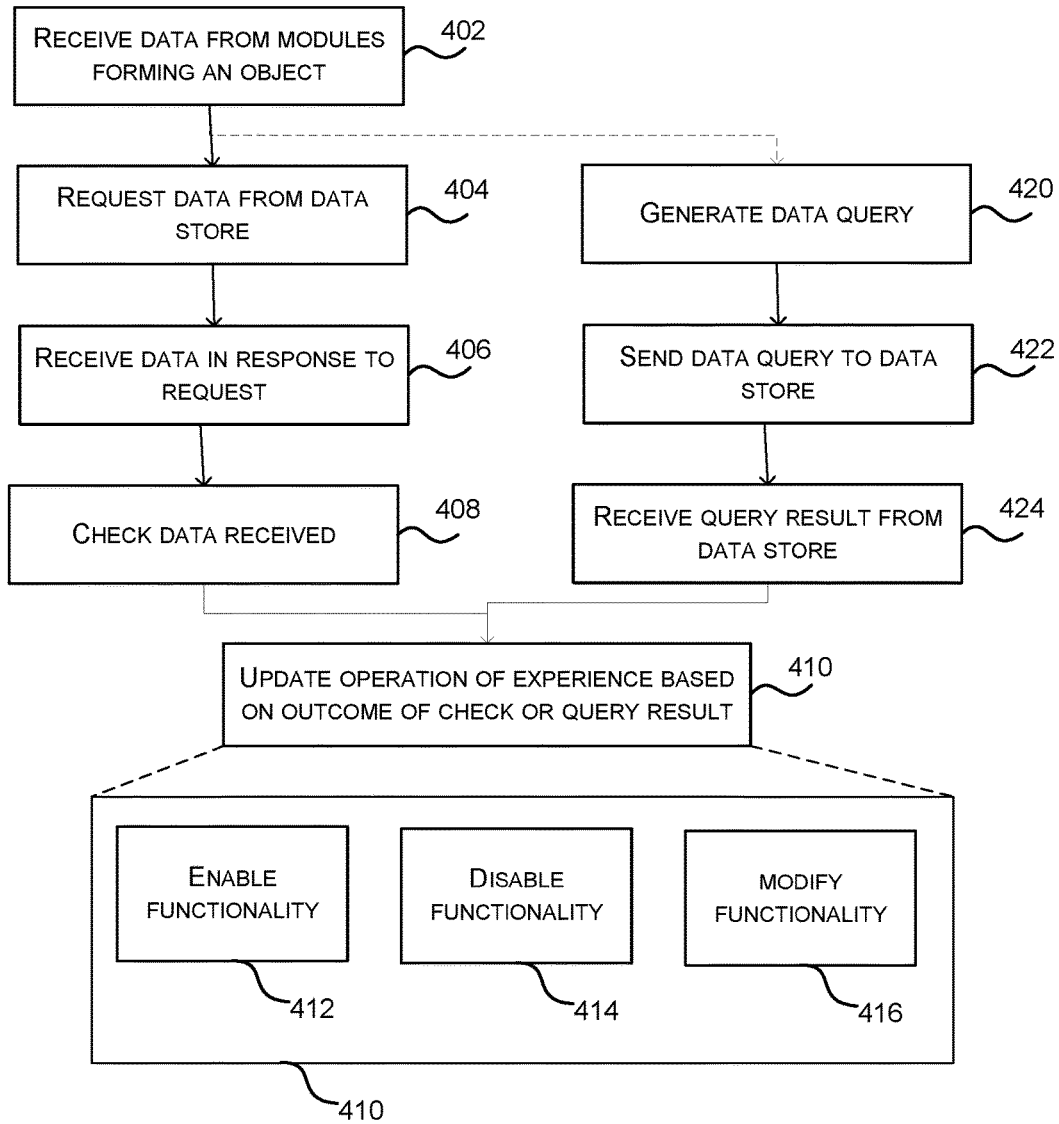
FIG. 4 is a flow diagram showing an example method of operation of an interactive software experience.

When an object initially connects to an interactive software experience 102, the interactive software experience 102 receives data identifying the modules forming the object (block 402), as shown in FIG. 4. As described above, this data may be received from one of the modules 106 within the object 108 or from more than one module within the object. In response to receiving this data about the modules in the object (in block 402), the interactive software experience communicates with the data store 101 (block 404 or 420). The interactive software experience 102 may request data from the data store 101 about each of the modules in the object (block 404). In various examples, the interactive software experience 102 may be required to communicate with the data store 101 to check the data records for each module each time a module is used with the interactive software experience; however, in other examples, the interactive software experience may check the data records less often.

In response to receiving a request for data (or access request) from the interactive software experience (block 306), the data store 101 provides the corresponding data to the interactive software experience (block 308), e.g. the data store 101 may send the data record (or a subset of each data record) for each of the modules identified in the access request to the interactive software experience. In some examples, the data may not be sent (in block 308) unless the data store successfully authenticates the interactive software experience (block 310). The authentication may involve the authentication service 118, e.g. via the use of shared secret and a challenge/response sequence, public/private key encryption, one-time key generation, or any other authentication technique.

When the interactive software experience receives the data records from the data store (block 406), it performs a check on those records (block 408). The check (in block 408) may, for example, involve checking that the user of the interactive experience owns the modules they are using or has been given permissions to use that module by the owner (e.g. for theft prevention), checking that the modules forming the object are permitted to be used together (e.g. based on interoperability data in the properties field 116), checking that the modules are permitted to be used with the particular interactive software experience (e.g. again based on interoperability data in the properties field 116), checking that the module is not counterfeit (e.g. based on using the authentication service to verify that its manufacture was approved), checking against geographic location (e.g. modules which are released only within a certain set of countries), checking against time or date (e.g. a prerelease module might be physically distributed but only become usable on a given day), checking against known blacklists or whitelists (e.g. checking that a module has not been reported destroyed and a replacement issued), etc. Based on the outcome of the checks performed (in block 408), the interactive software experience updates the way that it operates (block 410). There are many different ways that the operation may be affected and three examples are shown in FIG. 4: enabling functionality (e.g. enabling game play) as a result of the check (block 412), disabling functionality (e.g. disabling game play) as a result of the check (block 414) and/or modifying functionality (e.g. modifying game play) as a result of the check (block 416).

For example, functionality may be disabled (in block 414) where a permissions or interoperability field (within the properties field(s) 116) indicate that the module cannot be used with the particular interactive software experience. In various examples this may be user dependent or dependent on characteristics of the owner, where these characteristics may be stored within a data record or within a secondary database referenced within the data record.

There are many ways in which functionality (e.g. game play, where the interactive software experience is a game) may be modified (in block 416). The modification may be to the graphical user interface (GUI) and/or to the sequence of instructions/events within the interactive software experience (e.g. dependent upon the outcome of the check, different sequences of instructions/events may occur, instructions/events may be omitted/added to a sequence, etc.).

As also shown in FIG. 3, in various examples in response to receiving updated data relating to a module (block 302), the data store 101 updates the corresponding data record (block 304). The updated data may be received from the module to which it relates or from another module and in either example, the updated data is sent to the data store with the module ID of the module to which the data relates. In further examples, the updated data may be received from a user or an interactive software experience, as described in more detail below. The corresponding data record which is updated (in block 304) is therefore the record which contains the module ID received with the updated data (in block 302).

In the method described above the data check is performed by the interactive software experience (in block 408) based on the data records provided to it by the data store 101 (in block 308). In other examples, however, the checks may be performed by the data store 101 instead of the interactive software experience 102, or both parties (the data store 101 and the interactive software experience 102) may perform some checks.

In various examples where checks are performed by the data store 101 instead of the interactive software experience 102, the interactive software experience 102 generates a data query based on the module data received from the modules (block 420). The data query is sent to the data store (block 422) and in response to receiving the data query (block 320), the data store analyzes the query and the corresponding data records (block 322), where again the corresponding data records are those records having module IDs which match those module IDs identified in the query. The analysis performed (in block 322) may be similar to the checks described above (with reference to block 408), for example, checking that the user of the interactive experience owns the modules they are using (e.g. for theft prevention), checking that the modules forming the object are permitted to be used together (e.g. based on interoperability data in the properties field 116), checking that the modules are permitted to be used with the particular interactive software experience (e.g. again based on interoperability data in the properties field 116), etc. Having performed the analysis (in block 322), the data store provides a query result to the interactive software experience (blocks 324 and 424) and this is used to update the operation of the interactive software experience (in block 410).

There may be some checks that are performed that can only be performed by the data store 101 and not by the interactive software experience 102, such as checking that a module ID is a valid ID (e.g. as part of an anti-copying measure) and checking for duplicate module IDs (e.g. as part of an anti-cloning measure).

In various examples there may only be a single data record associated with a single physical module; however in other examples multiple data records may be used for the same physical module (i.e. having the same module ID) to record the activities of multiple users using the same object (e.g. different members of a family). Where there are multiple data records with the same module ID, these data records are distinguished based on the owner ID (which corresponds to the user). Use of multiple data records for the same physical module in this way may enable different users to have different permissions (e.g. to implement parental control functionality such that a user who is a child can only use the module with child-friendly games).

In various examples, the access request (received by the data store in block 306) and/or the analysis (performed by the data store in block 322) may result in an update to a data record for a module (block 326). For example, where the properties field(s) 116 for a module include data about its use, this data may be updated each time an interactive software experience indicates to the data store (by means of an access request or data query) that a module is being used with it. In another example, where the analysis performed by the data store (in block 322) identifies an anomaly, the data record to which the anomaly relates may be updated to prevent further use of the module (i.e. to effectively deactivate the module). The deactivation may be achieved by setting a properties field to 'inactive' or 'deactivated' or similar and/or by removing some or all of the data record from the data store. Examples of an anomaly may include a user who is not the owner using a module or identification of a duplicate module ID (e.g. two modules with the same module ID being used simultaneously within the system 100 or two modules with the same module being used within a short time period within the system 100 but at distant geographic locations) etc.

There may be other situations which result in a data record being updated to prevent further use of the module. In various examples, the data store may provide an interface to enable a user to update data records for modules that they own, i.e. data records which contain their owner ID 114. This may, for example, enable a user to communicate with the data store 101 if one of their modules is lost or stolen and as a result the modules may be deactivated. Such an interface 502, which is shown in the system 500 in FIG. 5, may also enable users 504 to update the data records in other ways (e.g. to perform a factory reset on a module, which restores all properties to their initial values) and/or to perform transactions with their modules, such as selling or lending modules, where any transfer of a module (whether temporary or permanent) may be a software swap or a hardware swap.

Where the transfer (e.g. sale or loan) is a hardware swap, users physically transfer the actual module (e.g. from user A to user B) and communicate with the data store to cause the data record associated with the module to be updated from {module ID, owner ID=user A, properties} to {module ID, owner ID=user B, properties}. In contrast, where the transfer is a software swap, there is no physical transfer of a module and instead the properties of a physical module (e.g. module A) belonging to one user (e.g. user A) are instead associated with a physical module (e.g. module B) belonging to another user (e.g. user B). Again, at least user A (i.e. the owner of the module the properties of which are being transferred) communicates with the data store to cause the data records for the two modules to be updated from {module ID=module A, owner ID=user A, properties=properties of module A} and {module ID=module B, owner ID=user B, properties=properties of module B} to {module ID=module A, owner ID=user A, properties=default value} and {module ID=module B, owner ID=user B, properties=properties of module A}. In other examples, instead of swapping properties, the module IDs and/or owner IDs may be swapped, for example, the data records for the two modules to be updated from {module ID=module A, owner ID=user A, properties=properties of module A} and {module ID=module B, owner ID=user B, properties=properties of module B} to {module ID=module B, owner ID=user A, properties=default value} and {module ID=module A, owner ID=user B, properties=properties of module A}. As a result of the software swap, module B now operates as if it is module A. Module A may be deactivated as a result of the transfer or reset to factory default properties.

As described above, transfers may be permanent (e.g. where a module is sold) or temporary (e.g. where a module is lent to another user). Where the transfer is temporary, one of the fields in the data record 110 (which may be the owner ID 114 or a properties field 116) may record the permanent owner (e.g. user A in the example above) and another field may record the temporary owner of the module (e.g. user B in the example above). In an example, the owner ID 114 may record the current owner (whether a temporary or permanent owner) and a properties field 116 may record the ID of the permanent owner of the module (where this may be the same or different from the ID stored in the owner ID field).

The software swap mechanism described above may also be used in the event that a physical module is lost, stolen or broken. A user (or system administrator) may transfer the properties field(s) associated with the module that is being replaced to another (e.g. a new) physical module such that this physical module provides an exact replacement (in terms of functionality within the system 100) for the lost/stolen/broken module. In various examples, the interface 502 may provide the functionality to enable a user to order a replacement physical module and the software swap may be performed by the system administrator prior to shipping the module to the user or by the user when the replacement physical module is received.

The interface 502 may enable a user to update other aspects of a data record (in addition to, or instead of, the owner ID as described above), such as the properties field(s). In an example, the interface 502 may provide a user with the ability to set or change permissions associated with a module. This may, for example, be used where a user lends a module to another user and wants to limit the changes to the module properties while the other user is using it. In various examples, a user may set the properties field(s) of a module to be read only (e.g. by setting a permissions field within the properties field(s)) so that the temporary owner of the module can use the module with interactive software experiences but any interaction with the interactive software experience does not result in a change in the data record (e.g. referring back to FIG. 3, even if the data store receives updated data in block 302, this does not cause the data record to be updated, such that block 304 is omitted). The read only restriction may apply to all properties fields or only a subset of those fields. In an example where the read only restriction applies to only a subset of the properties fields, activities of a temporary owner may not be able result in an update skill points or experience fields for the module, but other properties fields may be updated.

The interface 502 may, for example, be provided by a cloud-based service. As described above, this service may provide centralized access to the data records 506 for both interactive software experiences 102 and users 504.

Although in the above examples, the owner ID 114 corresponds to a user who owns the module, as described earlier, the owner ID may alternatively identify an entity other than a user, such as the manufacturer of the module or a licensee (e.g. of a particular character that the module resembles part of) and may be referred to as a manufacturer ID. In such examples, the manufacturer ID may, for example, implicitly provide interoperability information (e.g. modules can only be used with other modules having the same owner ID), although this may also apply where the owner ID corresponds to a user. In examples where the owner ID is a manufacturer ID and this manufacturer ID is verified using an authentication service, this may be used as an anti-counterfeiting measure (e.g. such that only genuine modules with a valid manufacturer ID as verified using the authentication service can be used).

In various examples, a module 106, 202, 204 stores a secret key (e.g. in storage element 206 as shown in FIG. 2) which is a hidden data store field that is only accessible via retrieving a property derived from the field (where the property is derived from the field within the module). For example, the module may comprise a secure secret storage whereby a limited-time key (generated by the module from the secret) may be able to be queried but the secret itself cannot be queried. This limited-time key can be passed to the authentication service for verification, as described above (e.g. to check that the part is not counterfeit).

In another example, the secret store may operate using a challenge-response protocol, whereby it receives a challenge (a data sequence) and returns the response (another data sequence which is the result of taking the challenge data and applying cryptographic operations based on the secret key, e.g. signing the data with the secret key which may be the private key in a public/private key system). The authentication service therefore operates by providing random challenges to the interactive software experiences (e.g. game clients) for forwarding to the modules, then when the authentication service receives the response(s) to the challenge (e.g where in one mode of operation the same challenge data to be used for all the parts in a coherent whole or alternatively different challenges may be used for each module in the object), it can provide verification to the game client. The verification may be at a high level.

In a third example, the interactive software experience (e.g. game client) itself may be untrusted and require verification as part of the process. For example, the above process may be augmented such that the interactive software experience first authenticates (i.e. proving it knows a shared secret) to the authentication service, and then the authentication service's challenges (to be sent to the parts) may be verifiably sent from the authentication service (i.e. the challenges are themselves "signed" by the authentication service to prove their origin is the authentication service itself). This has advantages in that it prevents the modules from sending any authentication data to untrusted interactive software experiences (since the interactive software experiences must get "permission" from the authentication system in the form of a signed challenge before the modules will respond to the challenge) and hence makes it more difficult to break the security system within a module, e.g. through conducting many iterations of challenge-response requests with the part in order to gather data which could be used to breaking the secret key (some types of such attack may be referred to as "known plaintext" attacks). While this arrangement of communications has the advantage outlined, there are other ways of architecting this system that may have other advantages, e.g. by building in the authentication service into a trusted interactive software experience, the interactive software experience may authenticate itself to the modules directly and then request the modules authenticate back, to allow both interactive software experiences and modules to be sure that the other party is trusted before enabling gameplay to occur, without relying on an internet connection to an internet-based authentication service.

In a fourth example, there may be no secret key—e.g. for a counterfeiting system, it suffices that the authentication service receives details of the module IDs sent from each module, and can then track and act on possible counterfeiting occurrences, e.g. because the same module ID is offered by many interactive software experiences, because requests originate from many geographic locations such that a single module is unlikely to have physically been at each place, or the number of requests is too high to feasibly come from a single user. The authentication service could blacklist IDs following such patterns. To handle the case that a counterfeit part is programmed to change its ID (e.g. picking a random ID), the authentication service could examine data such as the known valid module IDs that have been manufactured (which may be a sparse subset of the address space, i.e. not easily guessable by using a random ID), the number of module IDs that a given user or given game client is putting forward for authentication (e.g. detecting behavior of a user who apparently uses each module ID only once or a few times, or a user who apparently owns an infeasible number of modules, e.g. 1000s—which is a strong indication of the module using random-address behavior and hence being counterfeit), or that the user is the registered owner of the module ID. Sanctions can include suspending that user's ID (e.g. Xbox LIVE® ID) or suspending access by that game client to the authentication service.

Figure 5:
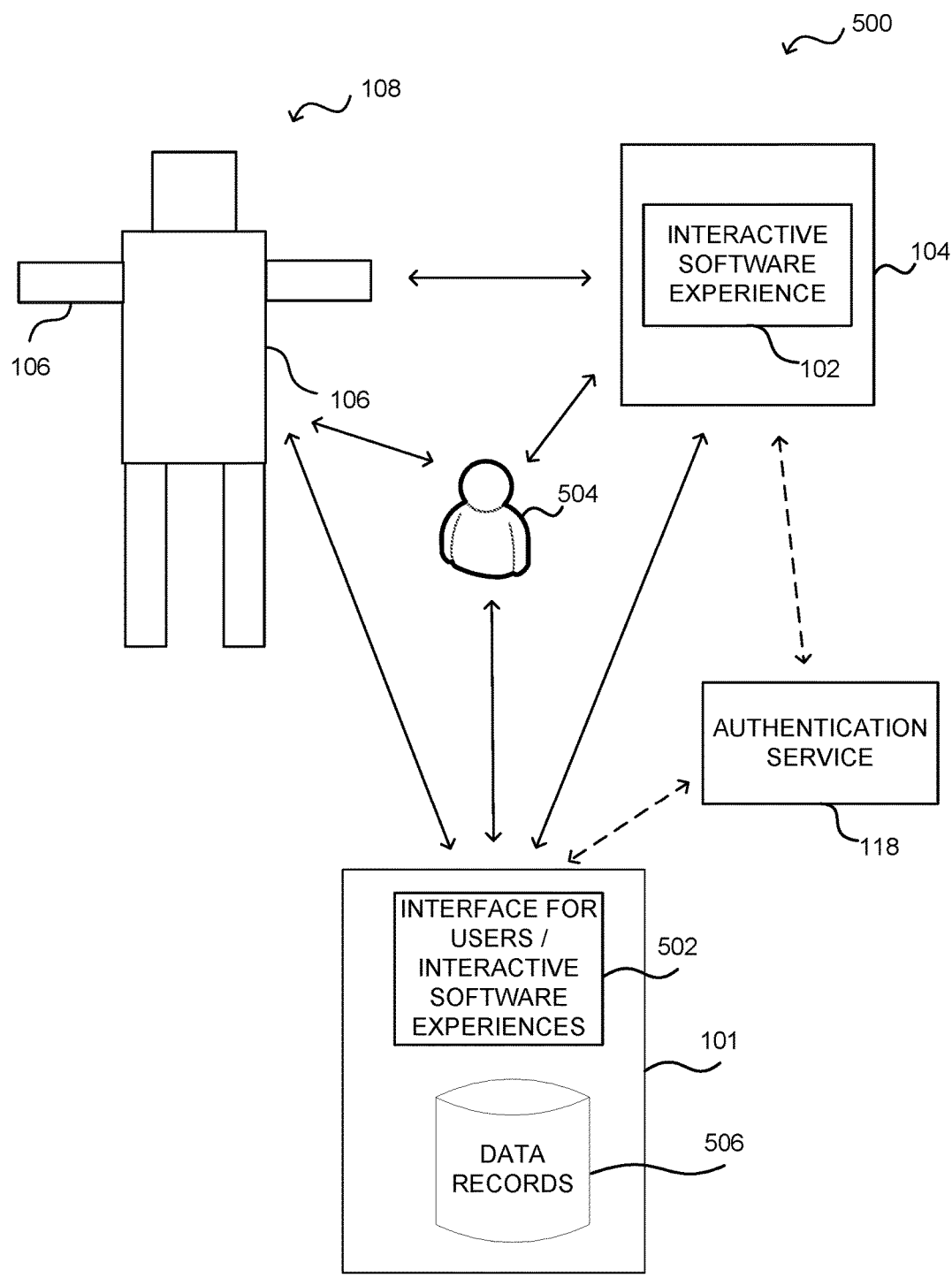
FIG. 5 is a schematic diagram of another example system comprising a data store which interacts with an interactive software experience.
Figure 6:
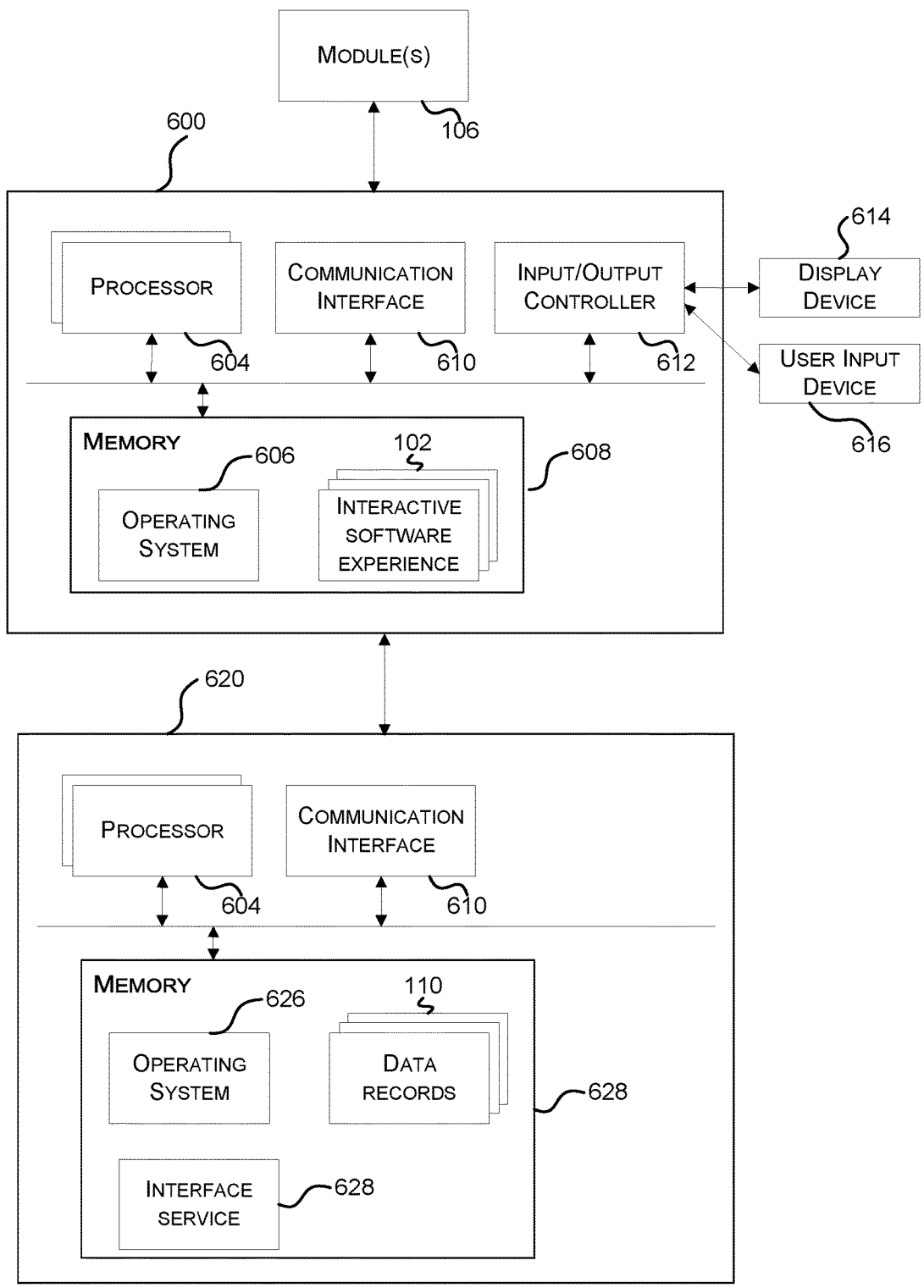
FIG. 6 illustrates two exemplary computing-based devices in which embodiments of the methods described herein may be implemented.

FIG. 6 illustrates various components of two exemplary computing-based devices 600, 620. The first exemplary computing-based device 600 (such as computing device 104 in FIGS. 1 and 5) may be implemented as any form of a computing and/or electronic device and on which one or more interactive software experiences 102 may run. The second exemplary computing-based device 620 (such as data store 101 in FIGS. 1 and 5) may be implemented as any form of a computing and/or electronic device and on which one or more data records 101 may be stored.

Computing-based device 600, 620 comprises one or more processors 604 which may be microprocessors, controllers or any other suitable type of processors for processing computer executable instructions to control the operation of the device in order to run the interactive software experience 102 or provide the interface 628 to the data records 110. In some examples, for example where a system on a chip architecture is used, the processors 604 may include one or more fixed function blocks (also referred to as accelerators) which implement a part of the functionality in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 606 or any other suitable platform software may be provided at the computing-based device to enable application software, such as the interactive software experience 102 or interface service 628 to be executed on the device.

The computer executable instructions may be provided using any computer-readable media that is accessible by computing based device 600, 620. Computer-readable media may include, for example, computer storage media such as memory 608, 628 and communications media. Computer storage media, such as memory 608, 628, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. The memory 628 is also arranged to store the data records 110.

Although the computer storage media (memory 608, 628) is shown within the computing-based device 600, 620 it will be appreciated that the storage may be distributed or located remotely and accessed via a network or other communication link (e.g. using communication interface 610). The communication interface 610 enables the computing-based device 600 to communicate with modules 106 and the two computing-based device 600, 620 to communicate with each other, either directly or via a network or intermediary device. The communication interface 610 may use wired or wireless technology.

The computing-based device 600 also comprises an input/output controller 612 arranged to output display information to a display device 614 which may be separate from or integral to the computing-based device 600. The display information may provide a graphical user interface. The input/output controller 612 may also be arranged to receive and process input from one or more devices, such as a user input device 616 (e.g. a mouse, keyboard, camera, microphone or other sensor). In some examples the user input device 616 may detect voice input, user gestures or other user actions and may provide a natural user interface (NUI). This user input may be used to select or control the interactive software experience 102. In various embodiments the display device 614 may also act as the user input device 616 if it is a touch sensitive display device. The input/output controller 612 may also output data to devices other than the display device, e.g. a locally connected printing device (not shown in FIG. 6).

Any of the input/output controller 612, display device 614 and the user input device 616 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a system as shown in FIGS. 1 and 5, the system described is provided as an example and not a limitation. As those skilled in the art will appreciate, the present examples are suitable for application in a variety of different types of systems including gaming systems (e.g. where the interactive software experience is a game).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'subset' is used herein to refer to a proper subset (i.e. such that a subset cannot comprise the entire set).

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A modular system for use with an interactive software experience, the system comprising a plurality of physical hardware modules and each module comprising:
    a storage element arranged to store an identifier of the module and module data for the module, wherein at least a portion of the module data is updated in use by the interactive software experience;
    one or more magnetic attachment points for attaching other modules to the module; and
    wherein one or more modules of the plurality includes a processor configured to collect data from other modules of the plurality, the data including identifiers of each of the other modules.

2. The system according to claim 1, wherein the magnetic attachment points include one or more connectors for attaching other modules to the module, each connector being arranged to pass data and power between modules.

3. The system according to claim 1, wherein the processor is configured to wirelessly collect the data from the other modules.

4. The system according to claim 1, further comprising:
    a communications module arranged to transmit the identifier and some or all of the module data to a computing-based device running the interactive software experience and to receive updated module data from the interactive software experience.

5. The system according to claim 4, wherein an operation of the interactive software experience is changed based on one or both of the transmitted identifier and module data.

6. The system according to claim 5, wherein one or both of the transmitted identifier and module data enable a previously inaccessible functionality of the interactive software experience.

7. The system according to claim 1, wherein the at least a portion of the module data comprises state data associated with the interactive software experience.

8. The system according to claim 7, wherein the state data associated with the interactive software experience is updated in use by the interactive software experience.

9. The system according to claim 1, wherein the module data comprises state data which is independent of the interactive software experience.

10. The system according to claim 1, wherein the data collected by the processor from the other modules of the plurality comprises at least one of the identifier and the module data of each of the other modules.

11. The system according to claim 1, wherein the module data comprises executable files comprising at least a part of the interactive software experience.

12. The system according to claim 1, wherein the module data comprises a model of the module for use in the interactive software experience.

13. The system according to claim 1, wherein each of the plurality of modules are configured to be assembled together into a coherent physical whole object.

14. The system according to claim 13, wherein the system is configured such that the interactive software experience is changed based on a unique combination of modules forming the coherent physical whole object.

15. The system according to claim 1, wherein the module data comprises a mini-game enabled within the interactive software experience as a result of using the module with the interactive software experience.

16. A method of operation of a modular system, the method comprising:
    transmitting an identifier and module data from a module to a computing-based device running an interactive software experience, wherein the module includes a processor configured to collect data from other modules of the modular system, the data including identifiers of each of the other modules, and executable files comprising at least a part of the interactive software experience; and a storage element arranged to store the identifier of the module and the module data;
    receiving updated module data from the computing-based device, the updated module data having been generated based on use of the module with the interactive software experience; and
    storing the updated module data in the storage element in the module.

17. The method according to claim 16, wherein operation of the interactive software experience is changed in response to module data received from one or more modules of the modular assembly system.

18. The method according to claim 17, wherein the module data received from the one or more modules enables a previously inaccessible functionality of the interactive software experience.

19. A modular assembly system comprising a module and the module comprising:
    a processor configured to collect data from other modules of the modular assembly system, the data including identifiers and module data of each of the other modules;
    a storage element arranged to store an identifier of the module and module data for the module;
    one or more magnetic attachment points for attaching other modules to the module; and
    a communications module arranged to transmit the identifier and module data of the module and the other modules to a computing-based device running an interactive software experience and to receive updated module data from the interactive software experience, the updated module data being generated in response to use of the module with the interactive software experience.

* * * * *